United States Patent [19]

Pearlman et al.

[11] Patent Number: 4,701,743
[45] Date of Patent: Oct. 20, 1987

[54] SIGNAL APPARATUS

[75] Inventors: Barry Pearlman, Chesterfield; W. Kenneth Menke, Glendale, both of Mo.

[73] Assignee: Public Safety Equipment, Inc., St. Louis, Mo.

[21] Appl. No.: 641,399

[22] Filed: Aug. 16, 1984

[51] Int. Cl.⁴ .............................................. B60Q 1/00
[52] U.S. Cl. .................................... 340/84; 318/256; 318/282; 340/50; 362/35
[58] Field of Search ............................ 340/84, 50, 81 R; 362/35, 61; 318/256, 280, 283, 285, 627, 281–282; 307/10 LS

[56] References Cited

U.S. PATENT DOCUMENTS

| | | | |
|---|---|---|---|
| 2,409,046 | 10/1946 | Kennelly | 340/50 |
| 2,417,934 | 3/1947 | Kennelly | 340/50 |
| 2,928,072 | 3/1960 | Arnold, Jr. | 340/50 |
| 3,133,263 | 5/1964 | Norberg | 340/982 |
| 3,309,661 | 3/1967 | Kennelly | 340/50 |
| 3,408,624 | 10/1968 | Kennelly | 340/50 |
| 3,557,325 | 2/1971 | Hansen | 318/256 X |
| 3,599,062 | 8/1971 | Crane et al. | 318/281 |
| 3,732,537 | 5/1973 | Freeman | 340/50 |
| 4,104,615 | 8/1978 | Hunter | 340/84 |
| 4,153,926 | 5/1979 | Hurt | 362/35 |
| 4,275,340 | 6/1981 | Schleupen | 318/256 X |
| 4,281,311 | 7/1981 | Gosswiller | 340/81 R |
| 4,306,180 | 12/1981 | Moore et al. | 318/256 X |
| 4,344,117 | 8/1982 | Niccum | 362/35 X |
| 4,357,595 | 11/1982 | Gosswiller | 340/50 X |
| 4,595,904 | 6/1986 | Gosswiller et al. | 340/50 X |

Primary Examiner—Glen R. Swann, III
Assistant Examiner—Thomas J. Mullen, Jr.
Attorney, Agent, or Firm—Senniger, Powers, Leavitt and Roedel

[57] ABSTRACT

Signal apparatus including an assembly for producing a signal beam and another assembly for sweeping the beam in at least one zone of rotation. A control circuit connected to the sweeping assembly causes it to sweep the signal beam in periodically reversed motion at a substantially constant angular velocity across the zone of rotation between preselected endpoints thereof.

32 Claims, 6 Drawing Figures

SIGNAL APPARATUS

BACKGROUND OF THE INVENTION

The present invention relates to signal apparatus and more particularly to signal apparatus for causing oscillation of a signal beam through one or more selectable arcs and for selectively causing revolutions of the beam.

Without limiting the scope of intended applications of the inventive apparatus, the background of the invention is described in connection with the field of emergency vehicle warning lights. Prior signal beam apparatus of this type has had several light sources, e.g. one to provide a beam of light sweeping through a full circle, another light source to provide a beam of light oscillating through an arc forward of the vehicle, and still another source to provide a beam of light oscillating through an arc to the rear of the vehicle.

In emergency vehicle applications it is desirable to control the flash rate of the signal light apparatus according to conventional specifications when these apply. "Flash rate" is the number of flashes of light seen by a fixed observer per unit of time when the observer is within the arc traversed by the beam of light, but not at the extreme end of the arc.

The apparent intensity of a flash to an observer increases when the amount of electrical energy for an electric light source is increased but decreases as the angular velocity of the beam is increased. In general, the average angular velocity has to be increased if flash rate is to be increased. Often, however, the apparent intensity of the flashes is to be maintained above a specified level for a given flash rate. Also, prior art devices vary in their angular velocity through an arc of rotation. Accordingly, the amount of electrical energy used for the light source must be sufficient in such circumstances to set the apparent intensity above the specified level in the part of the arc in which the angular velocity is greatest. However, the electrical energy is then partly wasted during traversal of the rest of the arc. Furthermore, it is sometimes desirable to maintain a selected flash rate regardless of whether oscillation through an arc or continuous rotation through many full revolutions is selected by an operator of the vehicle.

U.S. Pat. No. 3,408,624 shows a signal device for emergency vehicles, which has lamps that are respectively mechanically oscillated to front, side, and rear.

U.S. Pat. No. 4,281,311 shows a rotating signal light which is continuously driven at a non-uniform speed of rotation for the purpose of enhancing light intensity in certain predetermined directions and reducing light intensity in other directions. Such warning lights are said therein to be conventionally rotated at a constant speed. A rotating lamp and motor are operated in a circle utilizing brushes riding on collector ring segments cut for a predetermined arc. The brushes carry electric current for the lamp and motor. A resistance is connected in series with the motor when the motor is to be slowed down during portion of a revolution. Having a reflector or lens rotate about a stationary lamp is also mentioned.

In U.S. Pat. No. 4,104,615 a rotatable prism mounted with a nonrotatable source of light causes the resulting light beam to revolve.

U.S. Pat. No. 4,153,926 shows one lighting apparatus that rotates and another one that is mechanically oscillated.

U.S. Pat. No. 2,928,072 shows a rotary mirror arrangement, a stationary light source and an electric motor. The rotary mirror rotates and oscillates at the same time.

U.S. Pat. No. 3,133,263 describes a direction indicator utilizing two rotating lights producing different flash patterns when viewed from different positions.

U.S. Pat. Nos. 2,409,046 and 2,417,934 show white and red train lights which can be rotated into and out of viewing position. A limit switch halts the rotation. The selected white or red lamp which is made to be in register in the viewing position is caused to oscillate by a motor and mechanical linkage.

SUMMARY OF THE INVENTION

Among the objects of the present invention are to provide improved signal apparatus which operates any one signal beam in selectable modes of action; to provide improved and simplified signal apparatus which can provide from one source a beam which can selectively be made to rotate through a full circle at the same flash rate as it is made to oscillate through an arc thereof; to provide signal light apparatus of the foregoing selective action type which avoids passing current for either a lamp or a motor through moving contacts; to provide improved signal apparatus that produces a linear sweep of a beam during oscillations through an arc of a circle; to provide improved signal apparatus that has remotely or locally selectable flash rates; to provide improved signal apparatus that produces a beam oscillating in multiple selectable arcs; to provide improved signal apparatus that produces a beam oscillating through selectable arcs of variable angle that are either overlapping or separated; and to provide improved signal apparatus which is economical and reliable.

Other objects and features will be in part apparent and in part pointed out hereinafter.

Generally, and in one form of the invention, signal apparatus includes an assembly for producing a signal beam and another assembly for sweeping the beam in at least one zone of rotation. A control circuit connected to the sweeping assembly causes it to sweep the signal beam in periodically reversed motion at a substantially constant angular velocity across the zone of rotation between preselected endpoints thereof.

In general, and in another form of the invention, signal apparatus includes an electric lamp mounted stationary relative to a support and also includes a reflector assembly having a gear journalled to the support for rotation of the reflector assembly around the electric lamp. A reversible electric motor turns a worm gear coupled to the reflector assembly gear, and position sensing means is associated with the reflector assembly.

Generally, still another form of the invention involves a control circuit for an assembly for emitting a signal beam, a reversible motor coupled to at least part of the signal beam assembly to sweep the signal beam, and means for sensing when the signal beam assembly has reached either of two endpoints of an arc of rotation. The control circuit includes a circuit for selectively energizing the motor and also includes a bistable circuit. The bistable circuit is responsive to the sensing means for supplying a bistable output to the motor energizing circuit to cause the motor to sweep the signal beam across the arc of rotation and then reverse the motor when one of the endpoints is reached.

BRIEF DESCRIPTION OF THE DRAWINGS

FIG. 3 is a plan of the drive motor, the lower part of the signal beam assembly, and the position sensing assembly of FIG. 1;

FIG. 4. is a diagram of arcs and zones of rotation for use in discussing the advantageous operation of the invention;

Corresponding reference characters indicate corresponding parts throughout the several views of the drawings.

DETAILED DESCRIPTION OF THE PREFERRED EMBODIMENTS

Figure 1:
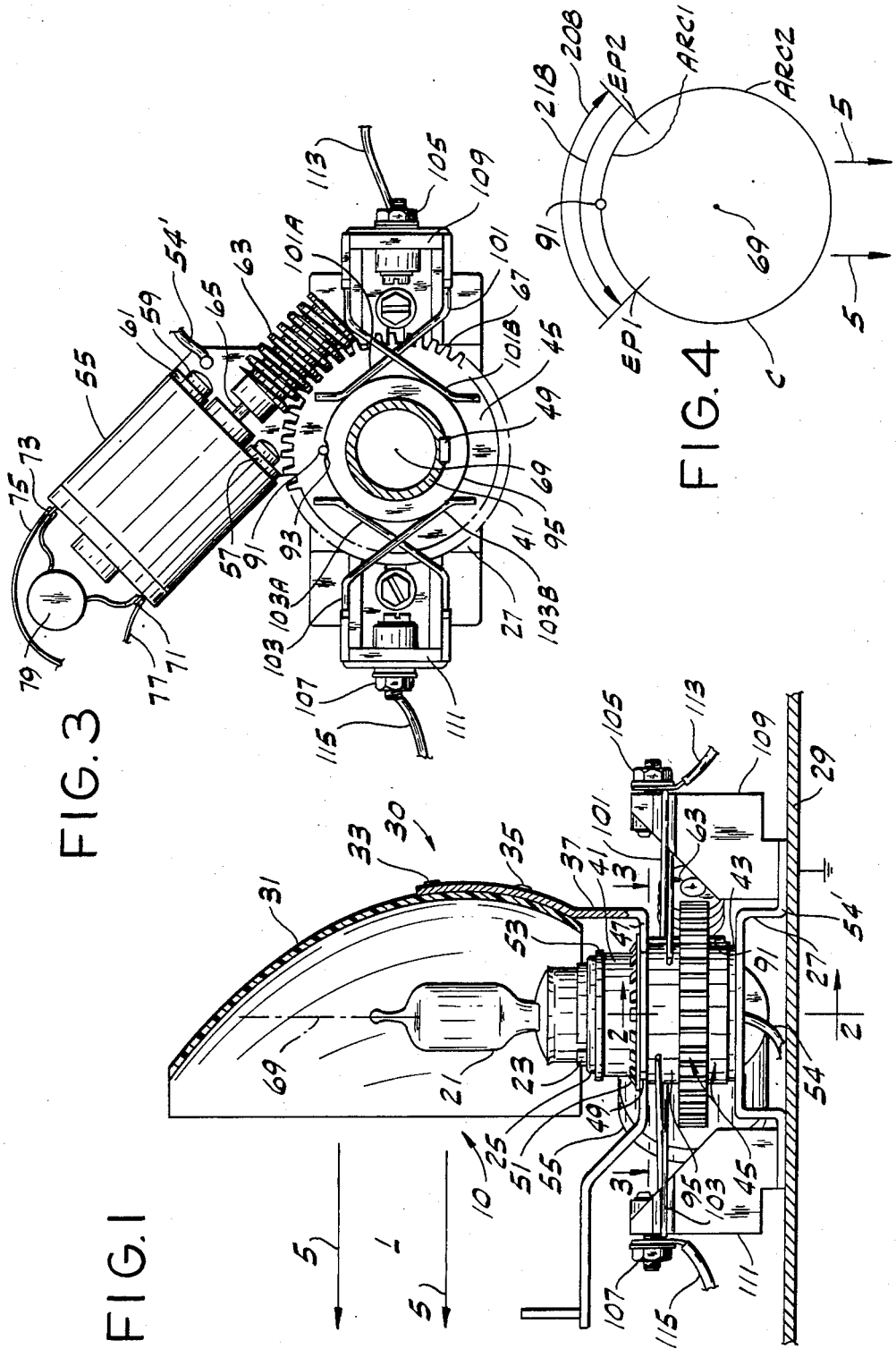
FIG. 1 is a side elevation of signal apparatus including a signal beam assembly, drive motor, and position sensing assemby according to the invention.
Figure 2:
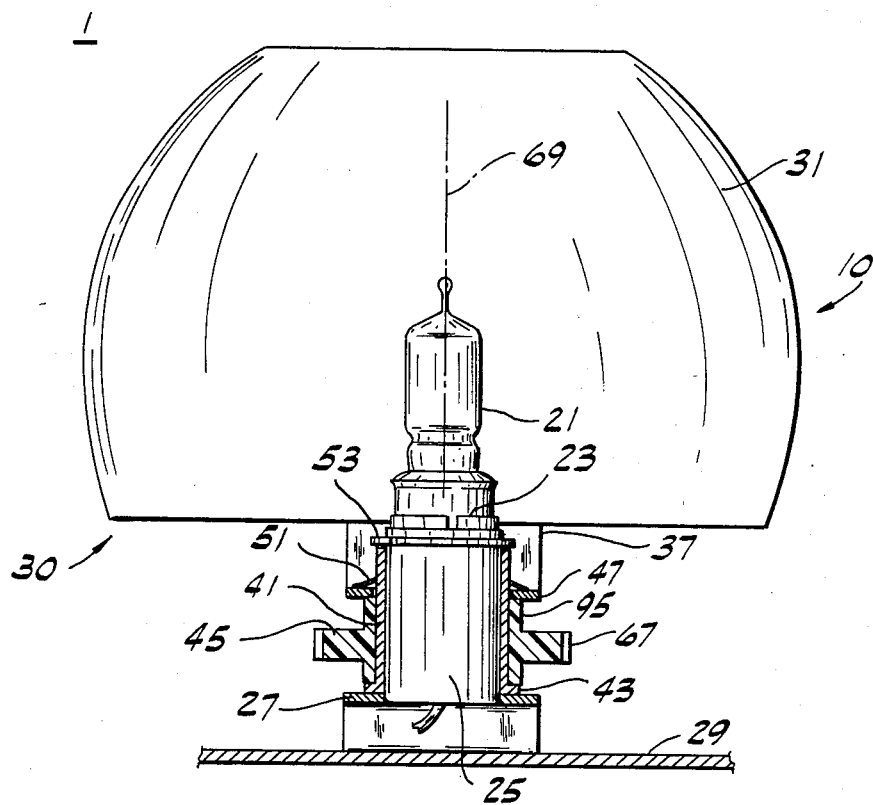
FIG. 2 is a front elevation in partial cross-section of the signal beam assembly of FIG. 1.

As shown in FIGS. 1-3 signal apparatus 1 will emit a signal beam 5 and has a signal beam assembly 10. Signal beam assembly 10 has an electric light bulb 21 seated in bayonet base 23, which in turn is affixed to a support made of a metal cylindrical bushing 25 rigidly attached on a base bracket 27. Base bracket 27 has an inverted "U" shape and is mounted to a metal floor 29 of a light bar housing (not shown) for an emergency vehicle. In signal beam assembly 10 a reflector assembly 30 has a silvered metal concave mirror 31 attached by a pair of rivets 33 and 35 to a support bracket 37.

A tubular bushing 41 is journalled on cylindrical bushing 25. Tubular bushing 41 has a bottom collar 43 which bears with relatively little friction in rotation, but good electrical contact, on the upper surface of base bracket 27. Bottom collar 43 also supports a toothed plastic gear 45. Gear 45 in turn supports reflector bracket 37. A circular hole with a keyway in a bottom part 47 of bracket 37 admits a key tab 49 of gear 45. A lockwasher 51 grasps tubular bushing 41 and presses the stack consisting of part 47 and gear 45 against the bottom collar 43 of tubular bushing 41. Tubular bushing 41 together with the just-mentioned stack thereon is loosely held on bushing 25 by a detachable retaining collar 53.

Light bulb 21, base 23, bushing 25, base bracket 27, and reflector assembly 30 constitute means for producing a signal beam. Bushing 25 and base bracket 27 constitute a support for the electric lamp made of light bulb 21 and base 23, which are mounted stationary relative to the support. The reflector assembly 30 includes the gear 45 journalled to the support (e.g., bushing 25 and base bracket 27) for rotation of the reflector assembly 30 around the electric lamp. A lead wire 54 extending from a center contact of bayonet base 23, together with the conductive material 54' of base bracket 27 (which is electrically continuous with the outer shell of bayonet base 23), constitute conductors for connecting a source of electricity for light bulb 21.

An inexpensive low-power direct current motor 55 is attached by screws 57 and 59 to a vertical end bracket portion 61 of base bracket 27. A worm gear 63 is affixed to a shaft 65 of motor 55, and worm gear 63 engages teeth 67 of gear 45 in a speed reducing arrangement. Motor 55 constitutes a reversible electric motor for turning the worm gear 63 coupling the motor to the gear 45 of the reflector assembly 30 of the signal beam producing means. Motor 55 and worm gear 63 constitute means for sweeping the beam 5 in at least one zone of rotation around-a vertical axis 69. Motor 55 has terminals 71 and 73 to which leads 75 and 77 are connected and across which a capacitor 79 is connected.

The use of electric motor 55 with a speed reducing arrangement permits the motor to accelerate almost immediately to a constant speed at each endpoint of a zone of rotation and then to drive the signal beam assembly 10 with substantially constant angular velocity, i.e., linear sweep, across the zone of rotation. When the other endpoint is reached, the motor decelerates almost immediately to a stop before reversing. Because the angular velocity is constant all across the zone of rotation, the flash intensity of the signal apparatus 1 is uniform across the zone of rotation. Flash intensity specifications for a given flash rate can thereby be met with a minimum of electrical energy drain on an automotive system and with less expensive, lower power components throughout signal apparatus 1.

In a further feature, the worm gear as speed reducer orients the shaft of motor 55 normal to axis 69, parallel to floor 29 and parallel to a plane through the teeth of gear 45. Consequently, motor 55 presents an advantageously low profile near floor 29, avoiding any optical obstruction of signal beam 5 or physical obstruction to reflector 31. In this way the signal apparatus 1 is further adapted for flexibility of operation in any selected arc or in complete revolutions.

An electrically conductive pin 91 is held in a shallow groove 93 in a shoulder 95 of gear 45. Pin 91 is electrically connected to bottom part 47 of bracket 37. Electrical continuity is established from pin 91 to base bracket 27 by bottom part 47, lockwasher 51, tubular bushing 41 and its bottom collar 43, and bushing 25. Pin 91 is at electrical ground as reflector assembly 30 rotates around light bulb 21 because of the journalling of bushings 25 and 41.

As shown in FIG. 4, pin 91 acts as a position indicating index which rotates with the signal beam 5 through an arc or zone of rotation designated ARC1 between first and second endpoints EP1 and EP2 thereof. A complete circle C of revolution for pin 91 is a full 360°, which is the sum of the zone of rotation ARC1 and the rest of the circle which is designated ARC2. Pin 91 constitutes an electrically conductive element attached to the signal beam producing means so that the electrically conductive element rotates through the zone of rotation ARC1.

A pair of V-shaped conductive wire brushes 101 and 103 are mounted by screws 105 and 107 to insulating standards 109 and 111 which are in turn bolted to floor 27. Each of the wire brushes 101 and 103 has wire portions or springs 101A, 101B and 103A, 103B which ride tangent on shoulder 95 of gear 45 and define four points of contact for pin 91. Brushes 101 and 103 constitute a plurality of readily adjustable electrically conductive brushes positioned to contact the electrically conductive element at the endpoints EP1 and EP2 of the zone of rotation. A pair of lead wires 113 and 115 extend from brushes 101 and 103 to an electronics package containing control circuit 150 of FIG. 5. The pin 91 and brushes 101 and 103 thus constitute position sensing means associated with the reflector assembly.

In a FULL CIRCLE rotation mode of the control circuit 150, the motor 55 turns the reflector 31 in a 360° circle.

In a DELAY mode, the motor 55 turns the reflector 31 until the pin 91 contacts one of the brushes 101 or 103 and takes the brush to ground or near ground potential. At this point in time, the motor 55 (and reflector assembly 30) stop, and after a time delay, the control circuit 150 powers the motor 55 in the opposite direction until the other brush is contacted. Control circuit 150 again reverses the motor direction after a delay. The reflector/motor drive thus swings between the two brushes 101 and 103, pausing at each brush for a predetermined amount of time.

In a RAPID mode, the motor/reflector assembly oscillates between two points (brushes) as described above. However, the delay is removed at the endpoints of rotation, (for a negligible delay).

Some applications call for a multiple number of arc segments or zones of rotation at different flash rates which are selectable via control signals. An example would be a 90° arc to the front of a vehicle in the RAPID mode, a 90° arc to the rear in the DELAY mode, and a full 360° rotation. In such case, multiple brush contact points are used and selected by the control circuit 150.

Figure 5:
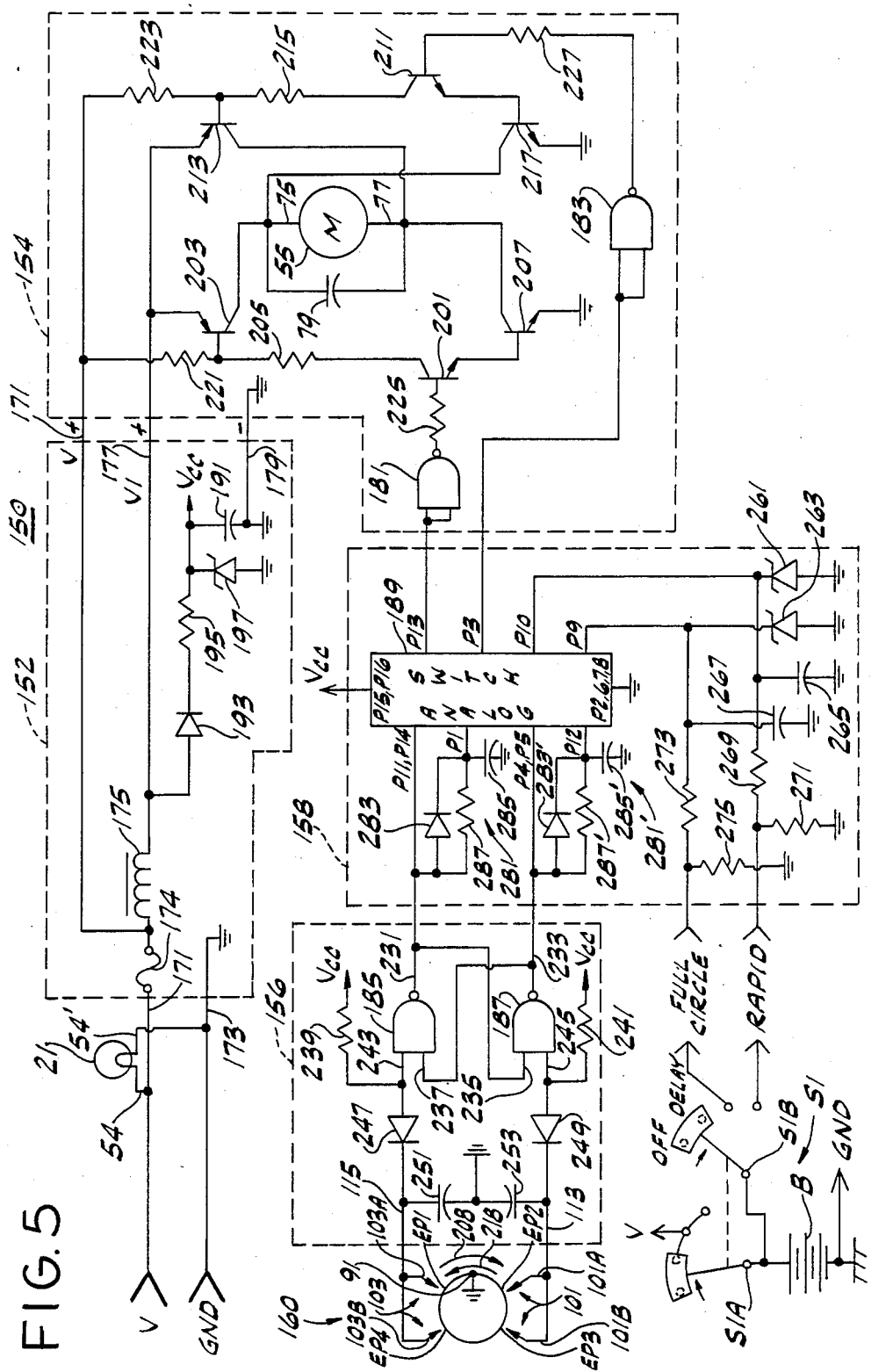
FIG. 5 is a schematic diagram of signal apparatus circuitry of the invention for controlling the drive motor in FIGS. 1-3.

In FIG. 5, a schematic diagram of control circuit 150 shows motor 55 and its terminals 75 and 77. Capacitor 79 is wired across motor 55 for noise suppression purposes. Control circuit 150 constitutes means for controlling the sweeping means to cause it to sweep the signal beam in periodically reversed motion at a substantially constant angular velocity across the zone of rotation between preselected endpoints thereof. A voltage conditioning circuit 152 and a transistor switching circuit 154 together constitute means for energizing the motor 55 in the sweeping means to sweep the signal beam 5 in a direction depending on the state of a flip-flop circuit 156.

Voltage conditioning circuit 152 and transistor switching circuit 154 also together constitute means for conducting a voltage to the electric motor to energize the motor, the voltage being substantially constant in magnitude as the signal beam is swept or driven across the zone of rotation. Thus the voltage and hence the angular velocity of reflector assembly 30 are constant as the signal beam is swept both clockwise and counterclockwise and also constant throughout the zone of rotation. Transistor circuit 154 also constitutes means responsive to the position detecting means for reversing the voltage in polarity when one of the endpoints of the zone of rotation is detected.

Flip-flop circuit 156 is connected to transistor switching circuit 154 by a selective switching circuit 158. Selective switching circuit 158 sets the control circuit 150 for the FULL CIRCLE, DELAY, and RAPID modes of operation in response to high or low signals (caused by rotary switch section S1B which is rotatable clockwise from "OFF" to "DELAY" to "FULL CIRCLE" to "RAPID") on the pins marked "FULL CIRCLE" and "RAPID".

Flip-flop circuit 156 is responsive to a position sensing or detecting circuit 160 which has the hereinabove described pin 91 (position indicating element located on the reflector assembly 30), and first and second brushes 101 and 103 for contacting the position indicating element when one of two endpoints EP1, EP2 of a predetermined arc of rotation are reached. Flip-flop circuit 156 is connected to the first and second brushes 101 and 103, and the transistor switching circuit 154 is connected to the flip-flop circuit 158 through selective switching circuit 158 for reversing motor 55 when the position indicating element, pin 91, contacts either of the brushes. Selective switching circuit 158 thus constitutes switching means for selectively connecting the flip-flop circuit to the means for energizing the sweeping means.

An automotive voltage of nominally 13.6 volts dc from a battery B is supplied through a rotary switch section S1A through terminals V and GND and along lines 54 and 54' to light bulb 21 when the light beam 21 is to be on. Also, the dc automotive voltage is conducted on lines 171 and 173 to voltage conditioning circuit 152. Control circuit 150 is protected by a fuse 174 connected in line 171. A series inductor 175 conducts current to a positive supply voltage terminal, or point, 177 which with a grounded negative supply voltage terminal, or point, 179 supplies a voltage V1 and current for motor 55 through transistor switching circuit 154. The inductor 175 and capacitor 79 both suppress electrical noise from motor 55. Also inductor 175 acts as a filter to prevent any noise in voltage V and entering line 171 from interfering with the operation of the control circuit 150.

A supply voltage $V_{cc}$ is provided for two NAND gates 181 and 183 wired as inverters in transistor circuit 154, for two NAND gates 185 and 187 in the flip-flop circuit 156, and for an analog switch 189 in selective switching circuit 158. Supply voltage $V_{cc}$ is supplied across a filter capacitor 191. Inductor 175 is wired in series with a diode 193, and diode 193 prevents $V_{cc}$ from going negative in the event of accidental reverse polarization across lines 171 and 173. Diode 193 is connected to a series resistor 195 to filter capacitor 191, and a Zener diode 197 is wired in shunt with the capacitor 191. Resistor 195 and Zener diode 197 prevent $V_{cc}$ from exceeding approximately 16 volts dc.

The NAND gates 181, 183, 185, and 187 are complementary metal oxide semiconductor (CMOS) gates. Any signal that is less than approximately 45% below the chip supply voltage $V_{cc}$ is interpreted as a logic low. Any signal that is above approximately 45% of $V_{cc}$ is interpreted as a logic high. CMOS logic devices output source current when they are at a logic high and sink current when they are at a logic low.

The operation of transistor switching circuit 154 is now described. When the base of an NPN transistor 201 is forward biased, transistor 201 saturates and current flows from terminal 177 through the emitter/base junction of a PNP transistor 203, through a resistor 205, through the collector/emitter circuit of transistor 201, and through the base/emitter junction of an NPN transistor 207 to ground.

This in turn causes transistors 203 and 207 to saturate and further causes current from terminal 177 to flow through the emitter/collector circuit of transistor 203, through motor 55, and through the collector/emitter circuit of transistor 207 to ground. Motor 55 lead wire 75 is thereby made more positive than its lead wire 77, and the motor 55 rotates reflector assembly 30 in a clockwise direction 208.

When the base of an NPN transistor 211 is forward biased, transistor 211 saturates and current flows from terminal 177 through the emitter/base junction of a PNP transistor 213, through a resistor 215, through the collector/emitter circuit of transistor 211, and through the base/emitter junction of an NPN transistor 217 to ground.

This in turn causes transistors 213 and 217 to saturate and further causes current from terminal 177 to flow through the emitter/collector circuit of transistor 213, through motor 55, and through the collector/emitter circuit of transistor 217 to ground. Motor 55 lead wire 77 is thereby made more positive than its lead wire 75, and the motor 55 rotates reflector assembly 30 in a counterclockwise direction 218.

Whenever current flows through inductor 175 to supply terminal 177, a slight voltage drop develops (approximately 0.3 to 0.4 volts dc) across the inductor 175. This voltage drop is used to advantage in turning transistors 203 and 213 hard off when transistors 201 and 211 are not conducting, respectively. The bases of transistors 203 and 213 are resistively tied to the 13.6 volts dc line 171 through respective resistors 221 and 223, which keeps the bases of transistors 203 and 213 at a higher potential than the emitters (reverse biased) and renders their collector/emitter circuits nonconductive when transistors 201 and 211 are not conducting.

The pair of NAND gates 181 and 183 drive transistors 201 and 211 through a pair of current limiting resistors 225 and 227 respectively. When the input of NAND gate 181 is low (approximately ground potential) and the input of NAND gate 183 is high (approximately $V_{cc}$), the motor 55 causes rotation of reflector assembly 30 in clockwise direction 208. When the input of NAND gate 181 is high and the input of NAND gate 183 is low, the motor 55 causes rotation of reflector assembly 30 in counterclockwise direction 218. When the inputs of NAND gates 181 and 183 are both high, the motor 55 is stopped as no current flows through its windings and reflector assembly 30 does not rotate at all. The inputs of NAND gates 181 and 183 are not both low simultaneously in this preferred embodiment because such a condition would cause transistors 203, 217 and 213, 207 to present short circuits from terminal 177 to ground.

Transistor switching circuit 154 thus includes two pairs of transistors 203, 207 and 213, 217. Each of transistors 201, 203, 207, 211, 213, and 217 have an input lead for the base, and first and second control leads for the emitter and collector respectively. The first control leads (e.g. to emitter) of the transistors 203, 207 in the first pair are respectively connected across voltage supply terminals 177 and 179; and the first control leads of the transistors 213, 217 in the second pair are respectively connected across the voltage supply terminals 177 and 179 too. The second control leads (e.g. to collector) of the first pair of transistors 203, 207 are connected across the motor 55. The second control leads of the second pair of transistors 213, 217 are connected across motor 55 in reverse compared to the second control leads of the first pair 203, 207.

In flip-flop circuit 156 the NAND gates 185 and 187 are connected in a set-reset flip-flop configuration wherein outputs 231 and 233 of each NAND gate are respectively connected directly to one input 235 and 237 of the other NAND gate. A pair of resistors 239 and 241 connected to $V_{cc}$, are pullup resistors for additional inputs 243 and 245 of the NAND gates 185 and 187. A pair of diodes 247 and 249 are respectively connected from brushes 103 and 101 to inputs 243 and 245 of the NAND gates 185 and 187. A pair of capacitors 251 and 253 shunt any radio frequency interference and stray noise on input lines 115 and 113 to ground.

Position sensing circuit 160 constitutes means for sensing or detecting when the signal beam assembly 10 has reached either of two endpoints of an arc or zone of rotation. Flip-flop circuit 156 constitutes means responsive to the sensing or detecting means for reversing the sweeping means when an endpoint is detected, as by supplying a bistable output to the energizing means (e.g. circuits 152 and 154) to cause the motor 55 to drive the signal beam assembly and sweep the signal beam across the arc of rotation and then reverse the motor when one of the endpoints is reached. Flip-flop circuit 156 also assumes first and second states in response to the detecting means corresponding to the endpoint reached. The transistor switching circuit 154 also in this regard constitutes means for energizing the motor in response to at least one of the outputs of the flip-flop circuit.

In the flip-flop circuit 156 of the preferred embodiment, lines 115 and 113 can be regarded as low-active set and reset inputs respectively, and outputs 231 and 233 can be regarded as high-active Q and Q-bar outputs respectively. When pin 91 touches either wire of brush 103, line 115 becomes grounded, setting Q output 231 high and Q-bar output 233 low. Since pin 91 is not then touching brush 101, line 113 as a reset input is pulled high by $V_{cc}$ through resistor 241 and is inactive. When pin 91 touches either wire of brush 101, line 113 becomes grounded and thus active, resetting Q output 231 low and Q-bar output 233 high. Since pin 91 is not then touching brush 103, line 115 as a set input is pulled high by $V_{cc}$ through resistor 239 and is inactive.

In transistor switching circuit 154, the input leads (e.g. to base) of the first and second pairs of transistors are coupled to at least one of the outputs 231 and 233 of the flip-flop circuit 156. Transistor switching circuit 156 includes the first and second additional transistors 201 and 211 respectively having control leads connected between the input leads of the first and second pairs of transistors (203, 207 and 213, 217), the two additional transistors having input leads respectively coupled to the first and second outputs 231 and 233 of the flip-flop circuit 156.

In selective switching circuit 158, analog switch 189 is a dual complementary metal oxide semiconductor (CMOS) analog multiplexer/demultiplexer, e.g. the commercially available 4052B circuit chip. It is analogous to a pair of four pole rotary switches ganged together, each section having its own common "wiper" at respective pins P3 and P13 of the chip. The "poles" or selectable positions of the switch are brought out to additional pins, of which pins P1, P4, P5, P11, P12, and P14 are used in circuit 158. The selected "pole" is determined by the logic levels present on a pair of control pins P9 and P10 of the analog switch 189. Since four input logic conditions are possible (11, 01, 10, 00), one of four switch "positions" can be selected. The selections correspond to user-selected operating modes established by the setting of user switch S1 having the ganged sections S1A and S1B. When a "pole" is selected on analog switch 189, a low resistance (less than 200 ohms) is presented between the selected "pole" and its "wiper" pin. This is a true resistance and allows bidirectional current flow. A high resistance (several million ohms) is present between the other "poles" and the "wiper" of each section. Chip supply voltage $V_{cc}$ is provided to analog switch 189 at pins P15 and P16. Pins P2, P6, P7, and P8 are grounded.

A pair of Zener diodes 261 and 263 protectively clamp the voltages appearing at the analog switch 189 control pins P9 and P10. A pair of capacitors 265 and 267 shunt radio frequency interference and noise to ground at the control pins P9 and P10. Pairs of resistors 269, 271 and 273, 275 hold control pins P9 and P10 at or near ground potential (logic low or logic zero) unless a logic high (logic one) is presented at one or both of the terminals "FULL CIRCLE" or "RAPID."

In the DELAY mode on switch S1, both pins P9 and P10 of analog switch 189 are left at or near ground potential. Analog switch 189 then establishes distinct low resistance paths between pins P1 and P3 and between pins P12 and P13. In an example of operation in the DELAY mode, assume that the brush 103 has just been contacted on wire 103A at endpoint EP1, producing a logic low on line 115. Flip-flop circuit 156 is set and Q output 231 goes high and Q-bar output 233 goes low.

The output 231 of flip-flop circuit 156 is directly connected to both pins P11 and P14 of analog switch 189, and output 233 is directly connected to both pins P4 and P5. None of the pins P11, P14 P4, and P5 are connected to a path in the DELAY mode. Output 231 is also coupled to pin P1 through a fast rise, slow decay, delay circuit 281. Delay circuit 281 thus constitutes electronic delay means connected across at least one of the outputs of the flip-flop circuit. Output 233 is also coupled to pin P12 by a second fast rise, slow decay, delay circuit 281' identical to circuit 281.

Delay circuit 281 has a diode 283 for directly coupling a high to analog switch 189 when a high occurs. A capacitor 285 is immediately charged by the high. When the high ceases, capacitor 285 discharges relatively slowly through a resistor 287, thereby delaying the high-to-low transition which would otherwise be presented to the transistor switching circuit 154 through analog switch 189. In other words, the delay circuit has a resistor 287 and diode 283 which are connected to a first output of the flip-flop circuit, and a shunt capacitor 285 to which the resistor and diode are thence connected, the voltage across the shunt capacitor being coupled to the energizing means.

Because the logic levels at outputs 231 and 233 are complementary, and make opposite transitions simultaneously when the flip-flop changes state upon an endpoint being reached, the effect of delaying a high-to-low transition on one of the outputs is to couple a pair of highs to the inputs of both NAND gates 181 and 183 for a predetermined length of time related to the time constant of the capacitor 285 and resistor 287. A pair of highs as pointed out hereinabove causes the transistor switching circuit 154 to remove voltage from motor 55 and consequently stop the motor 55 for the predetermined length of time at the endpoint to which the delay circuit corresponds when the delay circuit has been selected by switching circuit 158.

In an example of component values which can be chosen, capacitor 285 is 1 microfarad and resistor 287 is 470K ohms, resulting in a time constant of 0.47 second. Delay circuit 281' is provided with components having functions identical to those just described in connection with delay circuit 281, and the values of capacitor 285' and resistor 287' are identical in the preferred embodiment to those selected for delay circuit 281. Of course, different delay circuits or delay circuits differing in predetermined length of time from those just described and from each other can be substituted by the skilled worker. Resistor 287 can be implemented by a rheostat, or one of several resistors can be connected into the circuit by a mechanical or electrically-controllable switch means. Similarly, capacitor 285 can be selected from among several capacitors by a switch means incorporated into the control circuit 150. In general, the resistance and capacitance values can be changed or varied by any circuit or means which the skilled worker finds appropriate.

In the DELAY mode, then, capacitor 285 charges almost instantaneously through diode 283 and since pin P1 of analog switch 189 is connected through a low resistance path to pin P3, the input of NAND gate 183 is now at a logic high, taking its output low, turning off transistor 211 and preventing current flow to motor 55 through transistors 213 and 217.

Just as output 231 goes high when pin 91 reached endpoint EP1, the complementary output 233 goes from high to low. Since output 233 of flip-flop circuit 156 is low at this time and thus available to sink current, capacitor 285' of the other delay circuit 281' which was charged when output 233 was high, now begins to discharge through resistor 287'. Because pin P12 of analog switch 189 is connected through a low resistance path to pin P13, the voltage present at capacitor 285' is also present at the input of NAND gate 181. As long as the voltage across capacitor 285' is approximately 45% of $V_{cc}$ or greater, the output of the NAND gate 181 is at a logic low. This turns off transistor 201 and therefore, transistors 203 and 207 also do not conduct current through the motor 55. In this condition the motor 55 is stopped for a predetermined delay period D1 as hereinabove described.

When capacitor 285' discharges to approximately 45% or less of $V_{cc}$, the output of NAND gate 181 goes high and transistors 201, 203 and 207 conduct, causing motor 55 to rotate reflector assembly 30 in the clockwise direction 208 away from endpoint EP1 toward endpoint EP2. The pin 91 turns and contacts wire 101A of brush 101 at endpoint EP2 when the reflector assembly 30 has been driven across the zone of rotation ARC1.

When pin 91 contacts wire 101A at endpoint EP2, the converse of the operation described at endpoint EP1 occurs. Flip-flop circuit 156 changes state, bringing output 231 low and output 233 high. Capacitor 285' is rapidly charged through diode 283', and capacitor 285 begins to discharge through resistor 287. For a predetermined time interval D2 related to the time constant of delay circuit 281, the inputs to both NAND gates 181 and 183 are high, their outputs are low, and the motor 55 is stopped at endpoint EP2. Then when the voltage across capacitor 285 falls to approximately 45% of $V_{cc}$, the output of NAND gate 183 goes high. Transistors 211, 213, and 217 conduct, and motor 55 rotates the reflector assembly 30 in the counterclockwise direction 218, driving it back across the zone of rotation ARC1 to endpoint EP1, whence the oscillation is repeated.

When the terminal labelled "FULL CIRCLE" is brought high (raised to the 13.6 volts dc level by the user by turning ganged rotary switch sections S1A and S1B to the "FULL CIRCLE" position), pin P9 of the analog switch 189 is raised to a logic high. As a result, distinct low resistance paths are established in switch 189 between pins P3 and P2 and between pins P13 and P15. All other possible paths are extinguished. This connects pin P3 to ground and pin P13 to $V_{cc}$, placing the input of NAND gate 183 at or near ground potential and raising the input of NAND gate 181 high. Only the output of NAND gate 183 is high, turning on transistors 211, 213, and 217 and causing motor 55 to turn reflector assembly 30 in counterclockwise direction 218. Since the complementary outputs 231 and 233 of flip-flop circuit 156 are isolated from transistor switching circuit 154 in the FULL CIRCLE mode, motor 55 turns reflector assembly 30 in continual revolutions and the flip-flop circuit 156 is ignored.

In some applications, the flash rate of the signal apparatus 1 when the reflector assembly 30 is oscillating between endpoints EP1 and EP2 should be equal or related to the flash rate in another mode such as FULL CIRCLE. In the FULL CIRCLE mode, a flash occurs once per revolution. In the DELAY mode, a flash occurs twice per cycle of oscillation. In the DELAY mode the motor 55 turns at the same angular velocity as it does in the FULL CIRCLE mode. In order to equalize flash rates between the two modes, the following formula should be satisfied:

$$2T_{ARC1} + D1 + D2 = 2(T_{ARC1} + T_{ARC2}) \quad (1)$$

where $T_{ARC1}$ and $T_{ARC2}$ are the times required for the motor to drive reflector assembly 30 through ARC1 and ARC2 respectively, and D1 and D2 are the delays of circuits 281 and 281' at each of the endpoints EP1 and EP2 in the DELAY mode before motor 55 is reversed.

Equation (1) states, in effect, that to equalize flash rates between the DELAY and FULL CIRCLE MODES, the time required to complete one oscillation in the DELAY mode should be equal to twice the time required to complete one complete revolution because there are two flashes per oscillation and only one per revolution. Solving Equation (1) for the delay times yields the formula:

$$D1 + D2 = 2T_{ARC2} \quad (2)$$

Equation (2) states that in order to equalize flash rates, the sum of the predetermined time intervals D1 and D2 set by the values of components chosen for delay circuits 281 and 281' is equal to twice the time required to rotate the signal beam assembly through the rest of a circle exterior to ARC1 when the motor is energized. Accordingly, when the flash rates are equalized, circuits 281 and 281' constitute means for stopping the motor at each of the two endpoints for respective first and second predetermined time intervals having a sum substantially equal to twice the time which would be required by the motor to sweep the signal beam through the rest of a circle exterior to the arc when the motor is energized. Circuits 281 and 281' thus constitute electronic delay means, switchably interposed between the flip-flop circuit and the energizing means, for introducing a delay in operation of the sweeping means at the endpoints of the zone of rotation so that the flash rate of the signal beam when swept in the periodically reversed motion is equalized with a flash rate of the signal beam when swept in a complete circle at substantially the same angular velocity.

When circuits 281 and 281' have identical component values, delay D1 equals delay D2 and each delay is equal to the time $T_{ARC2}$ itself. The value of resistance to be selected for resistors 287 and 287' is readily determined by experimental adjustment with a decade resistance box until the number of flashes counted in a minute in the DELAY mode is equalized with the number of flashes counted in a minute in the FULL CIRCLE mode.

In the RAPID mode, the RAPID terminal is remotely switched high by the user by turning the ganged switch sections S1A and S1B again to "RAPID". Pin P10 of analog switch 189 is high and pin P9 is low, establishing distinct low resistance paths between pins P5 and P3 and between pins P13 and P14, thereby directly connecting the complementary flip-flop outputs 231 and 233 to NAND gates 181 and 183 respectively. Since the delay circuits 281 and 281' are thus bypassed, control circuit 150 causes motor 55 to drive reflector assembly 30 linearly back and forth through ARC1, only without the end delays D1 and D2.

In another way of describing one of the connections, the selective switching circuit 158 connects the first output to the energizing means in a first mode (DELAY) and connects the second output in place of the first output to the energizing means in a second mode (RAPID). Switching circuit 158 constitutes means for also connecting a constant voltage to the energizing means in a third mode (FULL CIRCLE). Thus, selective switching circuit 158 constitutes remotely operable or controllable switching means connected to the flip-flop circuit 156 and having a first mode for causing a logic signal from the flip-flop circuit to be fed to the transistor switching circuit to control operation thereof and a second mode for causing the complement of the logic signal to be fed to the transistor switching circuit in place of the logic signal.

It is thus to be noted that output 231 of flip-flop circuit 156 in the RAPID mode feeds NAND gate 181 and complementary bistable output 233 feeds NAND gate 183 which is the reverse of the connections accomplished by analog switch 189 in the DELAY mode. Because of the reversed connection, the reflector assembly 30 is rotated with pin 91 between brush wires 101B and 103B instead of 101A and 103A. Thus, in the RAPID mode, oscillation occurs through an arc defined by a pair of endpoints EP3 and EP4, with the signal beam 5 pointed in the opposite direction from that of the DELAY mode. Accordingly, in different modes, the same signal beam assembly is made to provide a beam of light sweeping through a full circle, a beam oscillating through an arc forward of a vehicle and a beam oscillating through an arc to the rear of the vehicle.

By placing the brushes 101 and 103 in any selected angular position around vertical axis 69 relative to the emergency vehicle forward direction as a reference, any selected direction of flash for the DELAY and RAPID modes is obtained. Physical adjustment of the brushes against shoulder 95 of gear 45 suffices to adjust the angular positions of the endpoints EP1, EP2, EP3, and EP4.

When both the FULL CIRCLE and RAPID mode terminals are switched high by switch section S1B, the analog switch 189 establishes distinct low resistance paths between pins P4 and P3 and between pins P11 and P13. This configuration still produces direct connection of the flip-flop outputs to the NAND gates 181 and 183 as in the RAPID mode. Consequently, the control circuit 150 is advantageously compatible with user selection of modes of operation by a progressively shorting rotary switch such as switch S1. The FULL CIRCLE and RAPID MODE terminals may advantageously also be connected to other signal apparatus on a light bar of an emergency vehicle warning system or to other control signal sources for flexibility in meeting requirements for a variety of products and custom applications.

Figure 6:
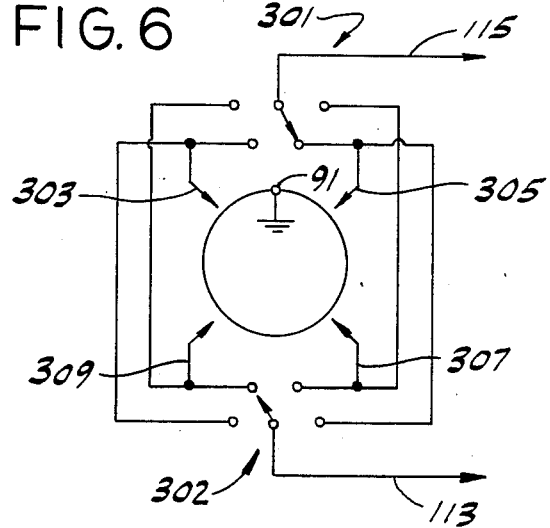
FIG. 6 is a schematic diagram of an alternative position sensing circuit for use with the circuitry of FIG. 5.

In FIG. 6, a pair of four pole single throw switches 301 and 302 have the four poles in each switch being respectively connected to four individual brushes or wires 303, 305, 307, and 309 contactable by pin 91. The wipers of the switches 301 and 302 are independently adjustable and are respectively connected to lines 115 and 113 to flip-flop circuit 156 for many different modes of operation. For instance, the wipers can be adjusted for twelve distinct arcs or zones of rotation, some overlapping others, in eight different center-of-zone directions and with arc widths of ¼, ½, and ¾ of a full circle. Switches 301 and 302 thus constitute switching means connecting the brushes selectively to the first and second inputs of the flip-flop circuit to accomplish different modes of operation of the sweeping means.

While the preferred embodiments are shown with a brush and ground pin approach to position sensing, other position-sensing means are contemplated. For instance, optical detectors or Hall-effect sensors may be used to detect an index mark, other surface features or a magnetic element located on the reflector assembly 30.

The analog switch 189 is omitted in some embodiments. Mechanical switches, digital logic, or other substitutions may of course be made for analog switch 189 as the skilled worker elects.

For example, when the signal beam is a light beam, a lamp may be either stationary or moving with a stationary or moving reflector or lens associated with the lamp. Signal beams of electromagnetic energy of any wavelength are contemplated in the practice of the invention.

It is contemplated that control circuit 150 or any part thereof can also be implemented in just one or two integrated circuit chips according to techniques familiar to the art of large scale integrated circuit design and manufacture.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. Signal apparatus comprising:
   means for producing a signal beam;
   means for sweeping the beam in at least one zone of rotation; and
   means for controlling the sweeping means to cause it to sweep the signal beam in periodically reversed motion at a substantially constant angular velocity across the zone of rotation between preselected endpoints thereof wherein said controlling means includes means for detecting when the sweeping means has reached either of the endpoints of the zone of rotation and means responsive to the detecting means for reversing the sweeping means when an endpoint is detected.

2. Signal apparatus as set forth in claim 1 wherein said sweeping means includes an electric motor and speed reduction means and said reversing means includes means for conducting a voltage to the electric motor to energize the motor, the voltage being substantially constant in magnitude as the signal beam is driven across the zone of rotation, the conducting means including means responsive to the detecting means for reversing the voltage in polarity when one of the endpoints of the zone of rotation is detected.

3. Signal apparatus as claimed in claim 1 further comprising an electrically conductive element attached to said signal beam producing means so that the electrically conductive element rotates through the zone of rotation, and wherein said detecting means includes a plurality of electrically conductive brushes positioned to contact the electrically conductive element at the endpoints of the zone of rotation, said reversing means including a flip-flop circuit for assuming one of first and second states and having first and second inputs electrically connected to said brushes respectively and being pulsed at a respective one of the inputs when the electrically conductive element contacts one of the brushes, said reversing means further including means for energizing the sweeping means to sweep the signal beam in a direction depending on the state of said flip-flop circuit.

4. Signal apparatus as set forth in claim 3 further comprising switching means for selectively connecting said flip-flop circuit to said means for energizing the sweeping means, said flip-flop circuit having first and second complementary outputs and said switching means connecting the first output to the energizing means in a first mode and connecting the second output in place of the first output to the energizing means in a second mode.

5. Signal apparatus as set forth in claim 4 wherein said switching means comprises means for also connecting a constant voltage to the energizing means in a third mode.

6. Signal apparatus as set forth in claim 3 wherein said brushes are a pair of generally V-shaped wires introducing at least four positions of contact for said electrically conductive element.

7. Signal apparatus as set forth in claim 3 further comprising switching means connecting said brushes selectively to the first and second inputs of said flip-flop circuit to accomplish different modes of operation of said sweeping means.

8. Signal apparatus comprising:
   means for producing a signal beam;
   means for sweeping the beam in at least one zone of rotation including an electric motor and a worm gear coupling the motor directly to the signal beam producing means; and
   means for controlling the sweeping means to cause it to sweep the signal beam in periodically reversed motion at a substantially constant angular velocity across the zone of rotation between preselected endpoints thereof, the controlling means including means for conducting a voltage to the electric motor to energize the motor, the voltage being substantially constant in magnitude as the signal beam is swept across the zone of rotation.

9. Signal apparatus comprising:
   means for producing a signal beam;
   means for sweeping the beam in at least one zone of rotation; and
   means for controlling the sweeping means to cause it to sweep the signal beam in periodically reversed motion at a substantially constant angular velocity across the zone of rotation between preselected endpoints thereof, wherein said controlling means includes means for detecting when the sweeping means has reached either of the endpoints of the zone of rotation, a flip-flop circuit having first and second complementary outputs and assuming first and second states in response to the detecting means corresponding to the endpoint reached, and said sweeping means includes a direct current motor and speed reduction means coupling the motor to the signal beam producing means, and said controlling means further includes means for energizing said motor in response to at least one of the outputs of said flip-flop circuit.

10. Signal apparatus as set forth in claim 9 wherein said energizing means comprises two pairs of transistors, the transistors each having an input lead and first and second control leads, the first control leads of the transistors in the first pair being respectively connected across voltage supply terminals, the first control leads of the transistors in the second pair being respectively connected across the voltage supply terminals, the second control leads of the first pair of transistors being connected across the motor, the second control leads of the second pair of transistors being connected across the motor in reverse compared to the second control leads of the first pair, the input leads of the first and second pairs of transistors being coupled to at least one of the outputs of the flip-flop circuit.

11. Signal apparatus as set forth in claim 10 wherein said energizing means further comprises first and second additional transistors respectively having control leads connected between the input leads of the first and second pairs of transistors, the two additional transistors having input leads respectively coupled to the first and second outputs of the flip-flop circuit.

12. Signal apparatus as set forth in claim 9 further comprising electronic delay means connected across at least one of the outputs of said flip-flop circuit.

13. Signal apparatus as set forth in claim 9 further comprising a resistor and a diode connected to the first output of said flip-flop circuit, a shunt capacitor to which the resistor and diode are connected, the voltage across the shunt capacitor being coupled to said energizing means.

14. Signal apparatus as set forth in claim 9 further comprising electronic delay means, switchably interposed between said flip-flop circuit and said energizing means, for introducing a delay in operation of the sweeping means at the endpoints of the zone of rotation so that the flash rate of the signal beam when swept in the periodically reversed motion is equalized with a flash rate of the signal beam when swept in a complete circle at substantially the same angular velocity.

15. Signal apparatus comprising:
an electric lamp mounted stationary relative to a support;
a reflector assembly including a gear journalled to the support for rotation of the reflector assembly around the electric lamp;
a reversible electric motor for turning a worm gear coupled to the reflector assembly gear;
position sensing means associated with the reflector assembly for sensing when the reflector assembly has reached either of two endpoints of an arc of rotation; and
means responsive to the position sensing means for reversing the reversible electric motor when either endpoint is detected.

16. Signal apparatus comprising:
an electric lamp mounted stationary relative to a support;
a reflector assembly including a gear journalled to the support for rotation of the reflector assembly around the electric lamp;
a reversible electric motor for turning a worm gear coupled to the reflector assembly gear; and
position sensing means associated with the reflector assembly and including an electrically conductive position indicating element located on the reflector assembly and first and second brushes for respectively electrically contacting the conductive position indicating element when either of two endpoints of a predetermined arc of the rotation of the reflector are reached.

17. Signal apparatus as set forth in claim 16 further comprising a flip-flop circuit connected to said first and second brushes, and a transistor switching circuit connected to said flip-flop circuit for reversing said motor when the position indicating element contacts either of the brushes.

18. Signal apparatus as set forth in claim 17 further comprising remotely controllable switching means connected to the flip-flop circuit and having a first mode for causing a logic signal from the flip-flop circuit to be fed to the transistor switching circuit to control operation thereof and a second mode for causing the complement of the logic signal to be fed to the transistor switching circuit in place of the logic signal.

19. Signal apparatus as set forth in claim 17 further comprising means connected to the flip-flop circuit for stopping the motor for a predetermined time interval at one of the endpoints of the arc of rotation before said motor is reversed.

20. Control circuit for an assembly for emitting a signal beam, a reversible motor coupled to at least part of the signal beam assembly to sweep the signal beam, and means for sensing when the signal beam assembly has reached either of two endpoints of an arc of rotation, the control circuit comprising:
means for selectively energizing the motor; and
means responsive to the sensing means for supplying a bistable output to the energizing means to cause the motor to sweep the signal beam across the arc of rotation and then reverse the motor when one of the endpoints is reached.

21. The control circuit as set forth in claim 20 further comprising means for stopping the motor for a predetermined time interval when the signal beam assembly has reached at least one of the endpoints of the arc.

22. The control circuit as set forth in claim 20 further comprising means for stopping the motor at each of the two endpoints for respective first and second predetermined time intervals having a sum substantially equal to twice the time which would be required by the motor to sweep the signal beam through the rest of a circle exterior to the arc when the motor is energized.

23. The control circuit as set forth in claim 20 further comprising remotely operable switching means for selectively connecting said bistable output means to said energizing means, said bistable output means comprising means for also supplying a complementary output, and said switching means connecting the first-named bistable output to the energizing means in a first mode and connecting the complementary output in place of the first-named bistable output to the energizing means in a second mode.

24. The control circuit as set forth in claim 23 wherein said switching means comprises means for also connecting a constant voltage to the energizing means in a third mode.

25. The control circuit as set forth in claim 21 wherein said energizing means comprises two pairs of transistors, the transistors each having an input lead and first and second control leads, the first control leads of the transistors in the first pair being respectively connected across voltage supply terminals, the first control leads of the transistors in the second pair being respectively connected across the voltage supply terminals, the second control leads of the first pair of transistors being connected across the motor, the second control leads of the second pair of transistors being connected across the motor in reverse compared to the second control leads of the first pair, the input leads of the first and second pairs of transistors being coupled to the means for supplying the bistable output.

26. Control circuit for a reversible motor driving a rotatable assembly for emitting a signal beam, the control circuit comprising:

means for selectively energizing the motor;
means for sensing when the signal beam assembly has reached either of two endpoints of an arc of rotation; and
means responsive to the sensing means and to a first user-selectable mode signal for supplying a first type of output to the energizing means to cause the motor to sweep the signal beam back and forth across the arc of rotation and responsive to another user-selectable mode signal for alternatively supplying a second, different output to the energizing means so that the motor rotates the signal beam assembly in one direction continuously.

27. The control circuit as set forth in claim 26 wherein said output supplying means includes means responsive to the sensing means and to the first mode signal for supplying a bistable output to the energizing means to reverse the motor when either of the endpoints is reached.

28. The control circuit as set forth in claim 26 wherein said output supplying means includes means for causing said energizing means to deenergize the motor for a predetermined time interval when the first mode signal is present and the signal beam assembly has reached at least one of two endpoints of the arc.

29. Signal apparatus for use with a source of voltage, comprising:

a rotatable assembly for emitting a signal beam;
a reversible motor coupled to said assembly to sweep the signal beam;
means for selectively energizing the motor;
means for providing a bistable output voltage; and
switching means for connecting said bistable output voltage in a first user-selectable mode to said means for energizing the motor to cause it to sweep the signal beam back and forth across an arc of rotation in periodically reversed motion and for alternatively connecting the source of voltage in another user-selectable mode to the energizing means so that the motor sweeps the signal beam in one direction continuously.

30. Signal apparatus as claimed in claim 29 further comprising electronic means for introducing a delay in operation of the motor at either end of the arc of rotation so that a flash rate of the signal beam when swept in periodically reversed motion is equalized with the flash rate of the signal beam when swept in one direction continuously.

31. Signal apparatus as claimed in claim 29 wherein said switching means includes means operable in a further user-selectable mode for selectively connecting said means for providing the bistable output voltage to said means for energizing the motor to cause the signal beam to oscillate in an arc of rotation different from that swept in the first mode.

32. Control circuit for a reversible motor driving a rotatable assembly for emitting a signal beam, the control circuit comprising:

means for selectively energizing the motor; and
means operable in a first user-selectable mode for supplying an output to the energizing means to cause the motor to sweep the signal beam back and forth across a first arc of rotation, and operable in a second user-selectable mode for supplying another output to the energizing means to cause the motor to sweep the signal beam back and forth across a different arc of rotation, and operable in a third user-selectable mode for supplying a third output to the energizing means to cause the motor to sweep the signal beam in one direction continuously.

* * * * *

UNITED STATES PATENT AND TRADEMARK OFFICE
CERTIFICATE OF CORRECTION

PATENT NO. : 4,701,743
DATED : October 20, 1987
INVENTOR(S) : Barry Pearlman & W. Kenneth Menke It is certified that error appears in the above—identified patent and that said Letters Patent is hereby corrected as shown below:

Column 17, claim 25, line 1, "21" should read -- 20 --.

Signed and Sealed this

Sixteenth Day of August, 1988

Attest:

DONALD J. QUIGG

*Attesting Officer*  *Commissioner of Patents and Trademarks*

US004701743B1

REEXAMINATION CERTIFICATE (3830th)

United States Patent [19]
Pearlman et al.

[11] B1 4,701,743
[45] Certificate Issued Aug. 10, 1999

[54] SIGNAL APPARATUS

[75] Inventors: Barry Pearlman, Chesterfield; W. Kenneth Menke, Glendale, both of Mo.

[73] Assignee: Public Safety Equipment, Inc.

Reexamination Requests:
No. 90/002,534, Dec. 4, 1991
No. 90/002,696, Apr. 10, 1992
No. 90/003,102, Jun. 23, 1993

Reexamination Certificate for:
Patent No.: 4,701,743
Issued: Oct. 20, 1987
Appl. No.: 06/641,399
Filed: Aug. 16, 1984

Certificate of Correction issued Aug. 16, 1988.

[51] Int. Cl.$^6$ ............................. F21V 21/30; B60Q 1/00
[52] U.S. Cl. ........................... 362/35; 318/256; 318/282; 340/472
[58] Field of Search ............... 362/35, 61; 343/757–766; 342/42, 51, 158, 368–377; 318/280–286, 627, 256; 340/472–473, 815.26; 367/93, 103; 307/10.8

[56] References Cited

U.S. PATENT DOCUMENTS

| | | | |
|---|---|---|---|
| 2,362,110 | 11/1944 | Meyerhoeffer | 362/361 |
| 2,421,593 | 6/1947 | Bishop | 343/761 |
| 2,478,242 | 8/1949 | Clapp | 343/766 |
| 2,502,975 | 4/1950 | McFarlane | 318/282 |
| 2,537,822 | 1/1951 | Fritts | 343/759 |
| 2,605,453 | 7/1952 | Miller | 318/282 |
| 2,644,152 | 6/1953 | Ginsberg | 340/473 |
| 2,680,223 | 6/1954 | Hammett | 318/627 |
| 2,726,389 | 12/1955 | Taylor | 343/761 |
| 2,754,513 | 7/1956 | Goubau | 343/761 |

(List continued on next page.)

FOREIGN PATENT DOCUMENTS

57-49841   10/1980   Japan .
60-15205   6/1984    Japan .

OTHER PUBLICATIONS

Brochure for Sonascanner™, manufactured by Meteor Corporation of Madison, Alabama, undated.

Brochure for SelectAlert™, manufactured by Public Safety Equipment, dated 1977.

H.T. Friis and W.D. Lewis, "Radar Antennas," *The Bell System Technical Journal*, vol. XXVI, No. 2 (Apr. 1947) pp. 219–317.

D.G. Fink and D. Christiansen, "Radar, Navigation, and Underwater Sound Systems" (Section 25) *Electronics Engineers Handbook*, 2nd Edition, McGraw–Hill Book Company, New York, NY, 1982, pp. 25–1 to 25–5.

Navy Training Courses, "Basic Electronics," *NAVPERS 10087*, United States Government Printing Office, Washington D.C. 1955, pp. 672–673 and 682.

Navy Training Courses, "Electronics Technician 1 & C," *NAVPERS 10192*, United States Government Printing Office, Washington D.C. 1958, pp. 358–365.

Navy Training Courses, "Electronics Technician 3 & 2," *NAVPERS 10317–A*, United States Government Printing Office, Washington D.C. 1959, pp. 339–370.

Selenia, Industrie Elettroniche Associate S.p.A., "SHF Antenna," *Rivista Tecnica elenia*, vol. 4, No. 4, 1977, pp. 47–74.

Jay, Frank and Goetz, J.S., *IEEE Standard Dictonary of Electrical and Electronic Terms*, The Institute of Electrical and Electronics Engineers, Inc., New York, N.Y., 1988, p. 81.

*IEEE Standard Dictionary of Electrical and Electronics Terms* Fourth Edition, Nov. 3, 1988, p. 513.

*Primary Examiner*—Thomas Mullen

[57] ABSTRACT

Signal apparatus including an assembly for producing a signal beam and another assembly for sweeping the beam in at least one zone of rotation. A control circuit connected to the sweeping assembly causes it to sweep the signal beam in periodically reversed motion at a substantially constant angular velocity across the zone of rotation between preselected endpoints thereof.

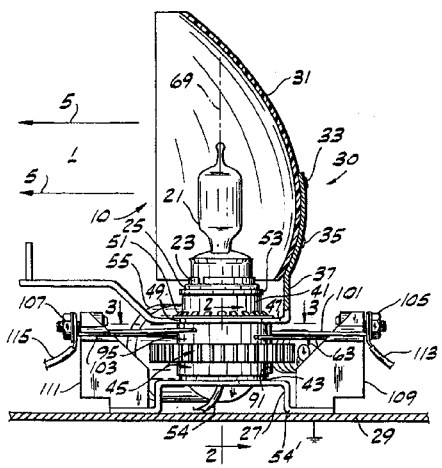

U.S. PATENT DOCUMENTS

| | | | |
|---|---|---|---|
| 2,846,663 | 8/1958 | Heehler et al. | 340/815.26 |
| 2,859,396 | 11/1958 | King | 318/282 |
| 2,973,481 | 2/1961 | Frye | 318/282 X |
| 2,973,518 | 2/1961 | Jensen | 343/837 |
| 3,166,699 | 1/1965 | Dalzell | 318/627 |
| 3,259,738 | 7/1966 | Strother, Jr. | 362/386 |
| 3,487,277 | 12/1969 | Walters | 318/282 X |
| 3,588,656 | 6/1971 | Shofner | 318/282 |
| 3,639,821 | 2/1972 | Byers et al. | 318/282 |
| 3,644,728 | 2/1972 | Hessemer et al. | 362/212 |
| 3,683,379 | 8/1972 | Saddler et al. | 342/71 |
| 3,790,938 | 2/1974 | Anderson et al. | 342/162 |
| 3,802,780 | 4/1974 | Helm et al. | 356/152 |
| 4,054,791 | 10/1977 | Du Shane | 362/35 |
| 4,058,794 | 11/1977 | Menke | 340/473 |
| 4,210,357 | 7/1980 | Adachi | 342/70 |
| 4,353,110 | 10/1982 | Ellis | 362/35 |
| 4,377,802 | 3/1983 | Ferenc | 340/472 |
| 4,413,451 | 11/1983 | Featherstone et al. | 343/902 X |
| 4,611,263 | 9/1986 | Kawai | 362/71 |

B1 4,701,743

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 15–19 is confirmed.

Claim 32 is cancelled.

Claims 1, 8, 9, 20, 23, 24 and 26–29 are determined to be patentable as amended.

Claims 2–7, 10–14, 21, 22, 25, 30 and 31, dependent on an amended claim, are determined to be patentable.

New claims 33–35 and 36–40 are added and determined to be patentable.

1. [Signal] *An emergency vehicle warning light signal* apparatus comprising:
   means for producing a signal beam *of visible light including a light source and a rotatable reflector*;
   means for sweeping the beam in at least one zone of rotation *by rotating said reflector*; and
   means for controlling the sweeping means to cause it to sweep the signal beam in periodically reversed motion at a substantially constant angular velocity across the zone of rotation between preselected endpoints thereof wherein said controlling means includes means for detecting when the sweeping means has reached either of the endpoints of the zone of rotation and means responsive to the detecting means for reversing the sweeping means when an endpoint is detected.

8. [Signal] *An emergency vehicle warning light signal* apparatus comprising:
   means for producing a signal beam *of visible light*;
   means for sweeping the beam in at least one zone of rotation including an electric motor and a worm gear coupling the motor directly to the signal beam producing means; and
   means for controlling the sweeping means to cause it to sweep the signal beam in periodically reversed motion at a substantially constant angular velocity across the zone of rotation between preselected endpoints thereof, the controlling means including means for conducting a voltage to the electric motor to energize the motor, the voltage being substantially constant in magnitude as the signal beam is swept across the zone of rotation.

9. [Signal] *An emergency vehicle warning light signal* apparatus comprising:
   means for producing a signal beam *of visible light*;
   means for sweeping the beam in at least one zone of rotation; and
   means for controlling the sweeping means to cause it to sweep the signal beam in periodically reversed motion at a substantially constant angular velocity across the zone of rotation between preselected endpoints thereof, wherein said controlling means includes means for detecting when the sweeping means has reached either of the endpoints of the zone of rotation, a flip-flop circuit having first and second complementary outputs and assuming first and second states in responses to the detecting means corresponding to the endpoint reached, and said sweeping means includes a direct current motor and speed reduction means coupling the motor to the signal beam producing means, and said controlling means further includes means for energizing said motor in response to at least one of the outputs of said flip-flop circuit.

20. Control circuit for *an emergency vehicle warning light having an assembly including a light source and a rotatable reflector* for emitting a signal beam *of visible light*, a reversible motor coupled to [at least part] *the reflector* of the signal beam assembly to *rotate the reflector and* sweep the signal beam, and means for sensing when the signal beam assembly has reached either of two endpoints of an arc of rotation, the control circuit comprising:
   means for selectively energizing the motor *to rotate the reflector*; and
   means responsive to the sensing means for supplying a bistable output to the energizing means to cause the motor to sweep the signal beam *of visible light* across the arc of rotation and then reverse the motor when one of the endpoints is reached.

23. The control circuit as set forth in claim 20 further comprising remotely operable switching means for selectively *electrically* connecting said bistable output means to said energizing means, said bistable output means comprising means for [also] supplying a complementary ouptut, and said switching means *electrically* connecting the first-named bistable output to the energizing means in a first mode and *electrically* connecting the complementary output in place of the first-named bistable output to the energizing means in a second mode.

24. [The control circuit as set forth in claim 23 wherein] *Control circuit for an assembly for emitting a signal beam, a reversible motor coupled to at least part of the signal beam assembly to sweep the signal beam, and means for sensing when the signal beam assembly has reached either of two endpoints of an arc of rotation, the control circuit comprising:*
   *means for selectively energizing the motor;*
   *means responsive to the sensing means for supplying a bistable output to the energizing means to cause the motor to sweep the signal beam across the arc of rotation and then reverse the motor when one of the endpoints is reached;*
   *remotely operable switching means for selectively connecting said bistable output means to said energizing means, said bistable output means comprising means for also supplying a complementary output, and said switching means connecting the first-named bistable output to the energizing means in a first mode and connecting the complementary output in place of the first-named bistable output to the energizing means in a second mode*, said switching means [comprises] *comprising* means for [also] connecting a constant voltage to the energizing means in a third mode.

26. [Control circuit for a reversible motor driving] *An emergency vehicle warning light apparatus comprising an emergency vehicle warning light assembly, said light assembly further comprising:* a base member for a light bar housing for an emergency vehicle;

a light source;

a rotatable assembly for emitting a signal beam[, the control circuit comprising:] *of visible light, said rotatable signal beam assembly including a rotatable reflector;* a reversible motor mechanically coupled to said reflector for rotating the reflector;

means for selectively energizing the motor;

means for sensing *the angular position of the reflector and for providing an index establishing the limits of arcuate sweep of the reflector and thereby sensing* when the rotatable signal beam assembly has reached either of two endpoints of an arc of rotation; and said emergency vehicle warning light apparatus further comprising:

an electrical control circuit, said control circuit including a user-operable electrical mode switch means, and means responsive to the sensing means and to a first user-selectable mode signal *generated in response to said user-operable electrical mode switch means* for supplying a first type of output to the energizing means to cause the motor to sweep the signal beam back and forth across the arc of rotation and responsive to another user-selectable mode signal *generated in response to said user-operable electrical mode switch means* for alternatively supplying a second, different output to the energizing means so that the motor rotates the *rotatable* signal beam assembly in one direction continuously.

27. The [control circuit] *emergency vehicle warning light apparatus* as set forth in claim 26 wherein said output supplying means includes means responsive to the sensing means and to the first mode signal for supplying a bistable output to the energizing means to reverse the motor when either of the endpoints is reached.

28. The [control circuit] *emergency vehicle warning light apparatus* as set forth in claim 26 wherein said output supplying means includes means for causing said energizing means to deenergize the motor for a predetermined time interval when the first mode signal is present and the signal beam assembly has reached at least one of two endpoints of the arc.

29. [Signal] *An emergency vehicle warning light signal* apparatus for use with a source of voltage, comprising:

a light source providing visible light;

a rotatable assembly *including a reflector rotatably mounted* for emitting a signal beam *of visible light provided by the light source*;

a reversible motor coupled to said assembly to sweep the signal beam;

means for selectively energizing the motor;

means for providing a bistable output voltage; and switching means for connecting said bistable output voltage in a first user-selectable mode to said means for energizing the motor to cause it to sweep the signal beam back and forth across an arc of rotation in periodically reversed motion and for alternatively connecting source of voltage in another user-selectable mode to the energizing means so that the motor sweeps the signal beam in one direction continuously.

33. An emergency vehicle warning light signal apparatus comprising:

means for producing a signal beam of visible light including a stationary light source and a reflector rotatable about said stationary light source;

means for sweeping the beam in at least one zone of rotation by rotating said reflector about said stationary light source; and means for controlling the sweeping means to cause it to sweep the signal beam in periodically reversed motion at a substantially constant angular velocity across the zone of rotation between preselected endpoints thereof wherein said controlling means includes means for detecting when the sweeping means has reached either of the endpoints of the zone of rotation and means responsive to the detecting means for reversing the sweeping means when an endpoint is detected.

34. Control circuit for an emergency vehicle warning light having an assembly including a stationary light source and a reflector rotatable about said stationary light source for emitting a signal beam of visible light, a reversible motor coupled to the reflector of the signal beam assembly to rotate the reflector about said stationary light source and sweep the signal beam, and means for sensing when the signal beam assembly has reached either of two endpoints of an arc of rotation, the control circuit comprising:

means for selectively energizing the motor to rotate the reflector; and means responsive to the sensing means for supplying a bistable output to the energizing means to cause the motor to sweep the signal beam of visible light across the arc of rotation and then reverse the motor when one of the endpoints is reached.

35. The control circuit as set forth in claim 34 further comprising remotely operable switching means for selectively electrically connecting said bistable output means to said energizing means, said bistable output means comprising means for supplying a complementary output, and said switching means electrically connecting the first-named bistable output to the energizing means in a first mode and electrically connecting the complementary output in place of the first-named bistable output to the energizing means in a second mode.

36. An emergency vehicle warning light apparatus comprising an emergency vehicle warning light assembly, said light assembly further comprising:

a base member for a light bar housing for an emergency vehicle;

a stationary light source;

a rotatable assembly for emitting a signal beam of visible light, said rotatable signal beam assembly including a reflector rotatable about said stationary light source;

a reversible motor mechanically coupled to said reflector for rotating the reflector about said stationary light source;

means for selectively energizing the motor; and means for sensing the angular position of the reflector and for providing an index establishing the limits of arcuate sweep of the reflector and thereby sensing when the rotatable signal beam assembly has reached either of two endpoints of an arc of rotation; and said emergency vehicle warning light apparatus further comprising:

an electrical control cirucit, said control circuit including a user-operable electrical mode switch means, and means responsive to the sensing means and to a first user-selectable mode signal generated in response to said user-operable electrical mode switch means for supplying a first type of output to the energizing means to cause the motor to sweep the signal beam back and forth across the arc of rotation and responsive to another user-selectable mode signal generated in response to said user-operable electrical mode switch means for alternatively supplying a second, different output to the energizing means so that the motor rotates the rotatable signal beam assembly in one direction continuously.

37. The emergency vehicle warning light apparatus as set forth in claim 35 wherein said output supplying means includes means responsive to the sensing means and to the first mode signal for supplying a bistable output to the energizing means to reverse the motor when either of the endpoints is reached.

38. An emergency vehicle warning light signal apparatus comprising:

a rotatable assembly for emitting a signal beam of visible light;

a reversible motor driving the rotatable assembly; and a control circuit comprising:

means for selectively energizing the motor; and means operable in a first user-selectable mode for supplying an output to the energizing means to cause the motor to sweep the signal beam back and forth across a first arc of rotation, and operable in a second user-selectable mode for supplying another output to the energizing means to cause the motor to sweep the signal beam back and forth across a different arc of rotation, and operable in a third user-selectable mode for supplying a third output to the energizing means to cause the motor to sweep the signal beam in one direction continuously.

39. An emergency vehicle warning light signal apparatus for use with a source of voltage, comprising:

a stationary light source providing visible light;

a rotatable assembly including a reflector rotatably mounted about said stationary light source for emitting a signal beam of visible light provided by the light source;

a reversible motor coupled to said assembly for rotating said reflector about said stationary light source to sweep the signal beam;

means for selectively energizing the motor;

means for providing a bistable output voltage; and switching means for connecting said bistable output voltage in a first user-selectable mode to said means for energizing the motor to cause it to sweep the signal beam back and forth across an arc of rotation in periodically reversed motion and for alternatively connecting the source of voltage in another user-selectable mode to the energizing means so that the motor sweeps the signal beam in one direction continuously.

40. An emergency vehicle signal light warning apparatus comprising:

a stationary light source providing visible light;

a rotatable assembly including a reflector rotatably mounted about said stationary light source for emitting a signal beam of visible light provided by the light source;

a reversible motor driving said rotatable assembly about said stationary light source;

means for selectively energizing the motor; and means operable in a first user-selectable mode for supplying an output to the energizing means to cause the motor to sweep the signal beam back and forth across a first arc of rotation, and operable in a second user-selectable mode for supplying another output to the energizing means to cause the motor to sweep the signal beam back and forth across a different arc of rotation, and operable in a third user-selectable mode for supplying a third output to the energizing means to cause the motor to sweep the signal beam in one direction continuously.

* * * * *